United States Patent [19]

Jodoin

[11] 4,382,156

[45] May 3, 1983

[54] MULTILAYER BUS BAR FABRICATION TECHNIQUE

[75] Inventor: Raymond C. Jodoin, Scottsdale, Ariz.

[73] Assignee: Rogers Corporation, Rogers, Conn.

[21] Appl. No.: 249,642

[22] Filed: Mar. 31, 1981

[51] Int. Cl.³ .............................................. H01B 5/00
[52] U.S. Cl. .................................. 174/72 B; 361/321
[58] Field of Search ............. 174/72 B; 361/321, 306; 29/25.41, 25.42

[56] References Cited

U.S. PATENT DOCUMENTS 4,081,857  3/1978  Hanold ................................. 361/321
4,236,046  11/1980  DeVries ............................ 174/72 B Primary Examiner—Roy N. Envall, Jr.
Attorney, Agent, or Firm—David S. Fishman

[57] ABSTRACT

A method of production of a miniaturized bus bar is presented wherein a layer of unfired ceramic is positioned between a pair of bus bar conductors.

5 Claims, 3 Drawing Figures

MULTILAYER BUS BAR FABRICATION TECHNIQUE

BACKGROUND OF THE INVENTION (1) Field of the Invention

This invention relates to bus bars, and especially to miniature bus bars characterized by a high capacitance. More particularly, this invention relates to the manufacture of multilayer bus bar assemblies. Accordingly, the general objects of the present invention are to provide novel and improved articles and methods of such character.

(2) Description of the Prior Art

Conventional bus bars of relatively small or miniature size have been known in the art for a number of years. Such bus bar devices are used for power and/or signal distribution in many systems such as, for example, computer back panels and integrated circuit systems. Such prior art multilayer bus bars comprise at least two conductive plates (usually in the form of elongated strips or bars of copper) separated by an insulating film. A typical prior art bus bar of this type may use copper conductors having a thickness of about 10 mils, and the overall dimensions of the bus bar may be from about 0.019 to 0.120 inches thick, from about 0.150 to 0.200 inches wide and range in length up to about 16 inches. Typically, the separating insulating layer is a plastic dielectric film such as the polyester material known as MYLAR. The MYLAR separator layer and the conductive plates are bonded together by an adhesive. Conventional prior art bus bars of this type have relatively low capacitance which results in the devices being comparatively ineffective in attenuating high frequency noise. This high frequency noise is highly undesirable, especially when the bus bar is used for signal distribution.

One prior art approach to eliminating the above-mentioned noise problem involves connecting capacitors to the bus bar after the completion of the bus bar assembly. While this approach raised the capacitance and minimized the noise, it resulted in additional expense and time in manufacturing.

Another type of bus bar structure known in the prior art includes discrete capacitive elements disposed between a pair of conductors. These bus bars have the desired high capacitance. Examples of such high capacitance bus bars are disclosed in U.S. Pat. Nos. 4,236,038 and 4,236,046 and in patent application Ser. No. 950,266, now U.S. Pat. No. 4,266,091, all of which are owned by the assignee of the present invention. The high capacitance elements utilized in the inventions of the aforementioned patents and application are comprised of thin wafers or chips of dielectric material, usually a ceramic with a high dielectric constant. The opposing surfaces of the chips are coated with a thin, integral and continuous film of conductive material and these conductive films are electrically connected to respective of the bus conductors.

SUMMARY OF THE INVENTION

The present invention relates to a novel and improved method of production of miniature bus bar assemblies characterized by high capacitance and to the bus bar assemblies resulting from practice of this novel method.

In accordance with the present invention, a bus bar assembly has a layer of green state or unfired ceramic bonded between a pair of bus bar conductors. The bus bar conductors serve both as conductors for distribution of power or signals and also as the plates of a capacitor which is defined by the bus bar conductors and the unfired ceramic sandwiched therebetween. If the dielectric constant of the green state or unfired ceramic is not sufficiently high, that dielectric constant may be raised by incorporating a low percentage of conducting or semi-conducting binder material in the ceramic.

BRIEF DESCRIPTION OF THE DRAWINGS

Referring now to the drawings, wherein like elements are numbered alike in FIGS. 1 and 2.

DESCRIPTION OF THE PREFERRED EMBODIMENT

Figure 1:
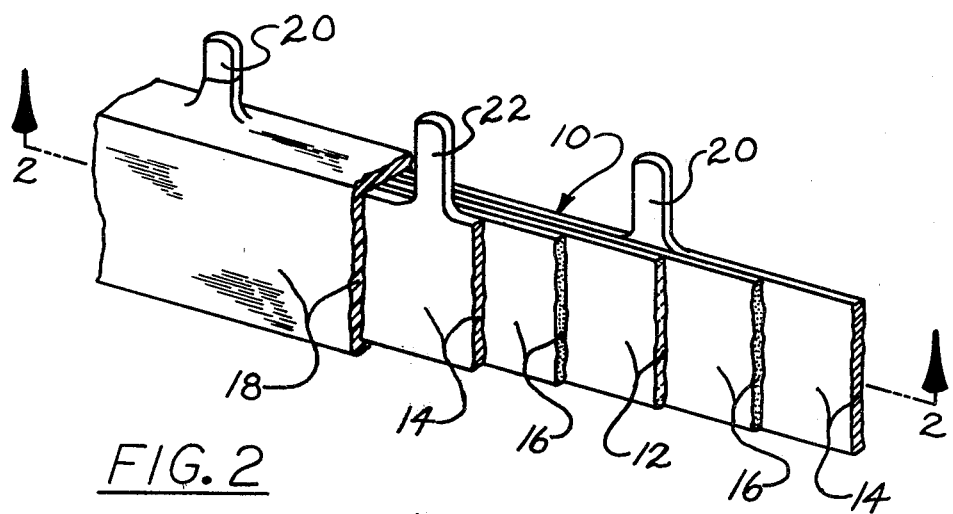
FIG. 1 is a perspective view of a portion of a laminated bus bar in accordance with the present invention, with various layers broken away for clarity of illustration.
Figure 2:
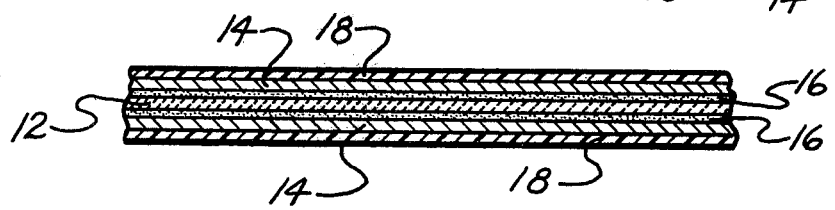
FIG. 2 is a sectional view taken along line 2—2 of a bus bar assembly constructed in accordance with the showing of FIG. 1.
Figure 3:
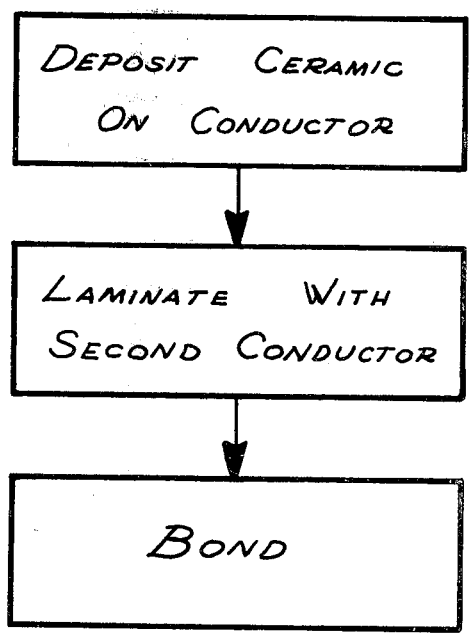
FIG. 3 is a flow diagram representing the manufacturing process for the bus bar assembly of FIGS. 1 and 2.

Referring to the drawing, a bus bar in accordance with the present invention is indicated generally at 10 and has a layer 12 of green state or unfired ceramic sandwiched between a pair of elongated bus bar conductors 14. As can be seen in the drawing, the bus conductors 14 are positioned on opposite sides of layer 12, so that the bus bar conductors 14 and ceramic makterial 12 therebetween constitute, in effect, an elongated strip or ribbon capacitor with the bus conductors also functioning as the capacitor plates. If desired or necessary, the "plates" 14 may be bonded to the opposite faces of layer 12 by means of an adhesive 16. The outer surface of each bus bar conductor 14 may be coated with a layer of insulating plastic 18, or the entire assembly may be encapsulated in such plastic. Distribution prongs or fingers 20 and 22 project, respectively, from each of the bus bar conductors 14 for the distribution of electrical power or signals.

The ceramic used in the present invention may be barium titanate or any other suitable ceramic which can be handled or applied in the green or unfired state.

The method of assembly of the structure of the present invention is as follows:

1. Deposit a layer of green or unfired ceramic on a first surface of one of a pair of bus bar conductors.
2. Place the second of the pair of bus bar conductors on the exposed surface of the layer of ceramic.
3. Bond the entire assembly together by any suitable method. The bonding step may include the use of adhesives between the layer of ceramic and the two bus bar conductors or bonding may alternatively or additionally include encapsulation of the assembly in an insulating plastic coating.

In the final assembly of the bus bar of the present invention, the bus bar conductors 14 serve both as bus bar elements for power or signal distribution and as plates of the capacitor defined by the bus bar conductors and the ceramic material sandwiched therebetween.

The bus bar conductors of the present invention are copper elements, which may be tin plated; and they are approximately 10 mils thick and range in width or height from about 0.150 to about 0.200 inches and range in length from about 2 to 16 inches, depending on the particular application for the bus bar. While the ceramic is preferably in the form of an elongated strip or ribbon, it may also be in the form of a series of linearly aligned individual sections whereby the assembly is effectively a plurality of individual capacitors which are electrically connected in parallel. The ceramic material from which the capacitive chips or strip capacitors are formed preferably has a relatively high dielectric constant, a dielectric constant in excess of 8,000 for example, and the thickness of the dielectric material may range from about 0.005 inches to about 0.015 inches.

While a preferred embodiment of the present invention has been shown and described, various modifications and substitutions may be made thereto without departing from the spirit and scope of this invention. Accordingly, it will be understood that the present invention has been described by way of illustration and not limitation.

What is claimed is:

1. A bus bar assembly including:
   a pair of spatially separated elongated conductors, said conductors each having a pair of oppositely disposed planar surfaces, the facing surfaces of said conductors being parallelly oriented; and
   a layer of ceramic material positioned between and in contact with the said facing surfaces of said conductors, said ceramic being in the green state.

2. The bus bar assembly of claim 1 wherein said layer of ceramic is continuous and is substantially coextensive in length with the conductors.

3. The bus bar assembly of claim 1 further comprising:
   means for mechanically and electrically connecting said layer of ceramic to said facing conductor surfaces.

4. The bus bar assembly of claim 3 wherein said layer of ceramic is continuous and is substantially coextensive in length with the conductors.

5. A method of forming a multilayer bus bar comprising the steps of:
   depositing a strip of unfired ceramic material on a first planar surface of an elongated bus conductor;
   placing a second bus conductor in contact with the ceramic, said second bus conductor being elongated and having a planar surface and said step of placing including orienting said second conductor surface parallel with the first planar surface of the first conductors; and
   securing the conductors and ceramic together to define a unitary assembly.

* * * * *